June 7, 1955   N. P. S. STRAUSSLER   2,709,982
PNEUMATIC WHEEL FOR VEHICLES
Filed Sept. 29, 1952   3 Sheets-Sheet 1
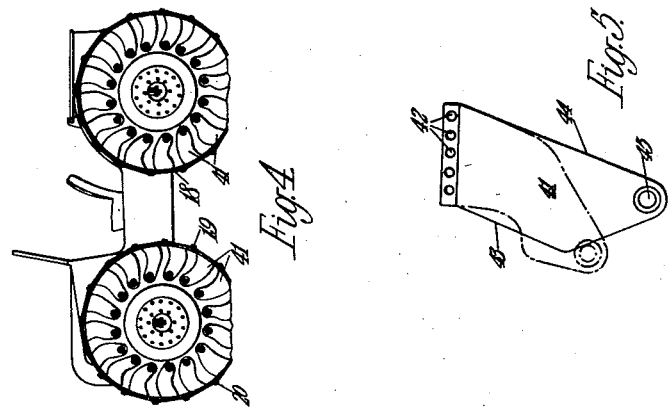
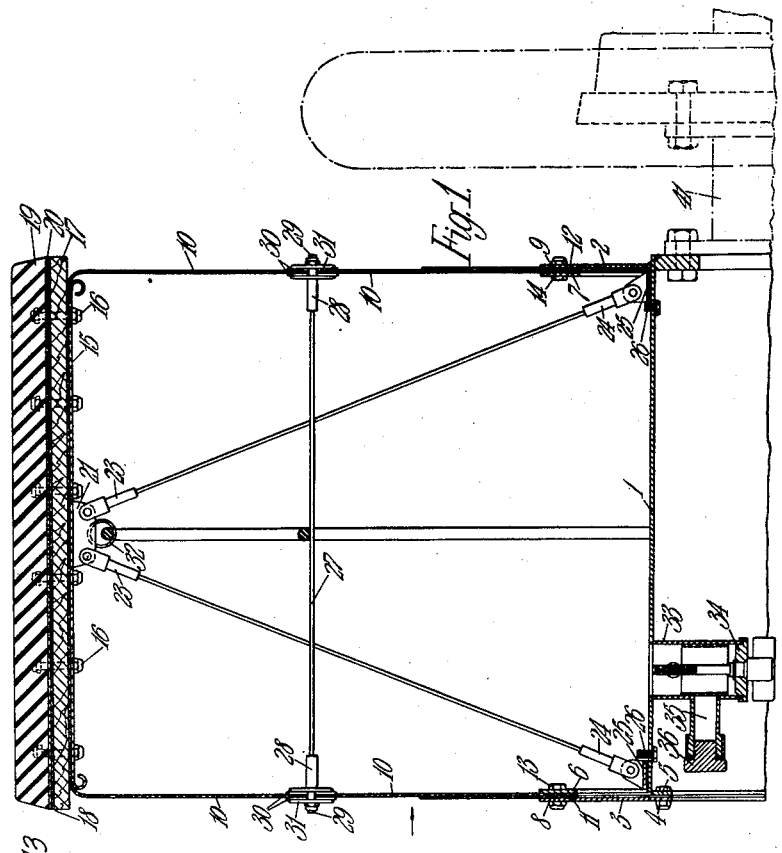
Inventor
N. P. S. Straussler June 7, 1955　　N. P. S. STRAUSSLER　　2,709,982
PNEUMATIC WHEEL FOR VEHICLES Filed Sept. 29, 1952　　3 Sheets-Sheet 2

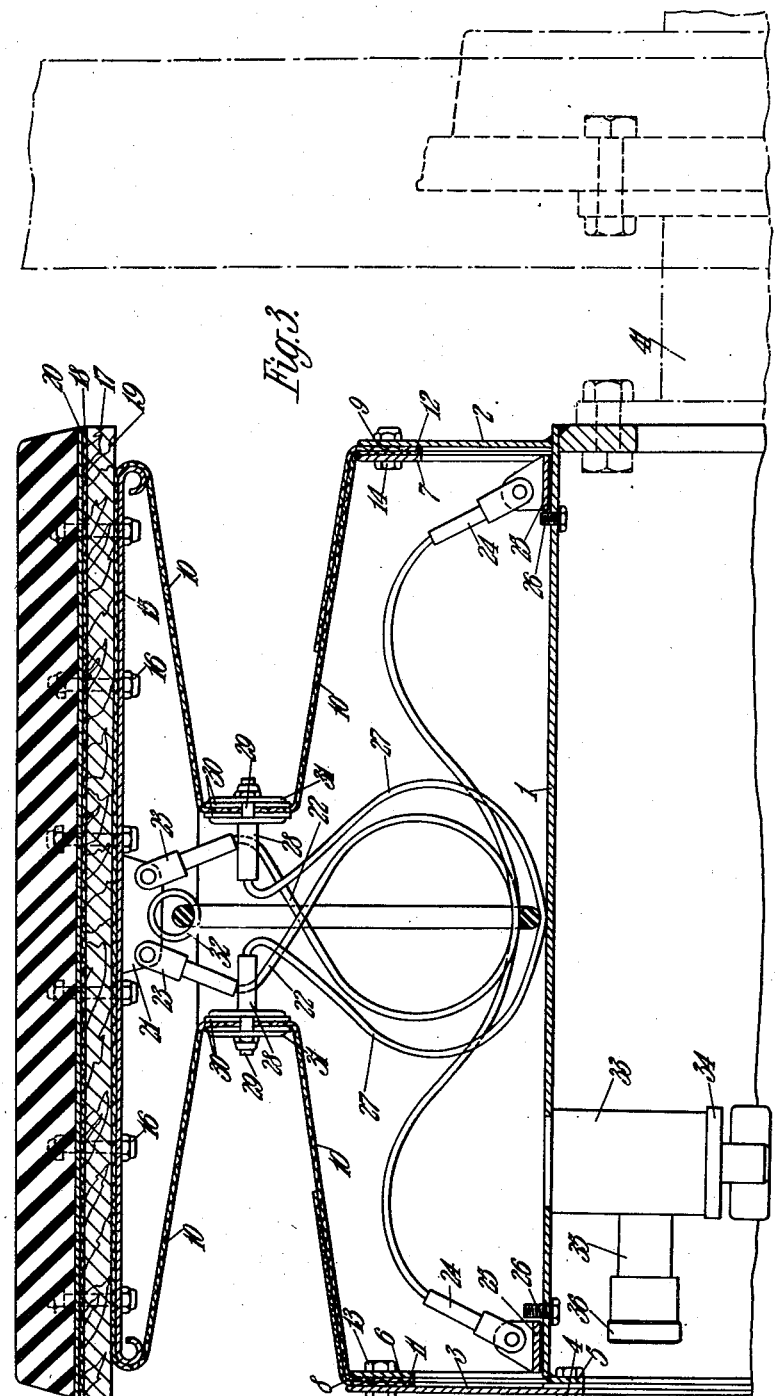

United States Patent Office 2,709,982
Patented June 7, 1955

2,709,982

PNEUMATIC WHEEL FOR VEHICLES

Nicholas Peter Sorrell Straussler, London, England

Application September 29, 1952, Serial No. 311,967

Claims priority, application Great Britain October 4, 1951

7 Claims. (Cl. 115—19)

This invention relates to pneumatic wheels for motor vehicles the one object being to provide an improved wheel which will enable vehicles to travel on soft or snow covered ground without substantial loss of tractive effort due to slipping or sanking thereinto such as is liable to occur with pneumatic tyred wheels normally employed.

A further object of the invention is to provide collapsible pneumatic wheels for light motor vehicles for example military vehicles known as "jeeps" which serve the purpose of rendering the vehicle amphibious inasmuch as they will impart adequate buoyancy to the vehicle and at the same time provide for its propulsion when afloat.

The wheel comprises a flexible impervious envelope of non-elastic material substantially of the shape of a cylinder having flat or substantially flat ends, the inner portions of the latter being secured centrally to an axle or hub which may be a solid rod or tube in an airtight manner. The axle or hub may be secured to the two ends by means of flanges and clamping rings between which the said ends are secured by means of bolts or other suitable means.

The displacement of these float wheels may be such that one-third to one-half of the total displacement of each thereof, is above the water line whereby the rotation of the floats by power will propel the vehicle, due to the engagement of the tread bars with the water so that they act as paddle-wheels.

In the deflated and collapsed condition the wheels are of relatively small dimensions and may be carried in a container on the vehicle until required for use.

Referring to the accompanying drawings:

Figure 1 is a sectional elevation of the upper half of a pneumatic vehicle wheel according to the invention;

Figure 3 is a diagrammatic view in sectional elevation showing a wheel in collapsed condition;

Figure 4 is a diagrammatic side elevation of an amphibious motor vehicle having auxiliary wheels according to the invention, the wheels being also provided with paddles to facilitate propulsion of the vehicle when afloat;

Figure 5 is a detail view of a paddle; and

Figure 6 is an enlarged view of an auxiliary paddle such as is shown in elevation in Fig. 5.

Figure 2:
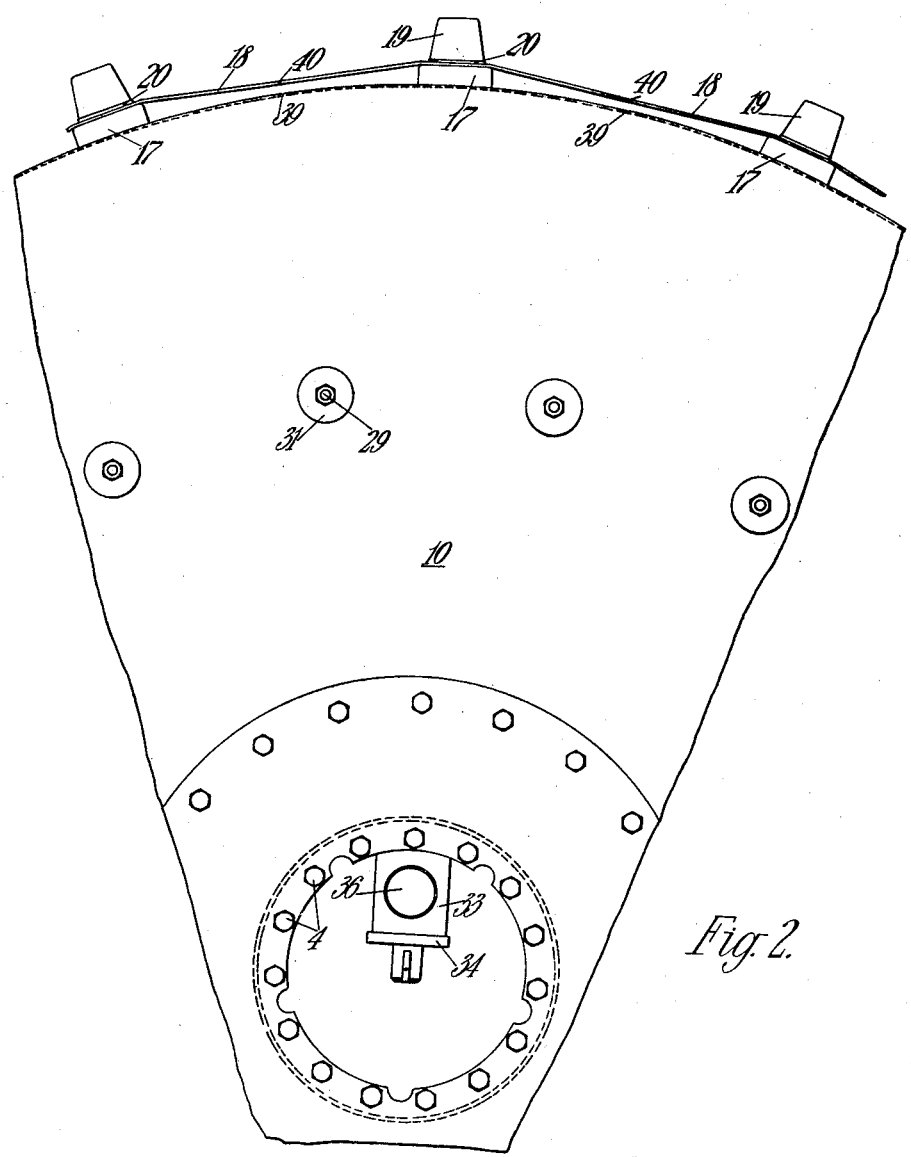
Figure 2 is a side elevation of part of Figure 1 looking in the direction of the arrow.

In the drawings and referring first to Figures 1, 2 and 3, the wheel has a tubular hub or axle 1, having a flange 2 permanently secured to and projecting outwardly from one end thereof. A flange 3 is also provided at the other end of the hub but this flange is secured in an airtight manner by bolts 4 to a ring 5 permanently secured to and projecting inwardly into the hub. These flanges 2 and 3 and rings 6 and 7 serve for receiving and clamping between them in an airtight manner the inner margins 8 and 9 of the end walls of an inflatable envelope 10, now to be described.

When inflated the envelope 10 is of cylindrical form as will be seen from Figure 1. The envelope is of impervious non-elastic material for example rubberised fabric, the fabric being preferably closely woven fabric the inner margins 8 and 9 of the end walls being strengthened by having these portions formed of two united plies of the rubberised fabric as shown, the inner zones of the two ply portions 11, 12 being clamped respectively between the flanges 2 and 3 and rings 6 and 7 by means of the bolts 13, 14. The peripheral wall of the envelope is reinforced transversely by wood or metal bars 15 preferably steel bars arranged at regular intervals against the inner periphery of the cylindrical portion and secured in position by bolts 16 which also hold in position distance pieces of wood 17, a continuous cover band 18 of rubberised fabric spaced from the periphery of the envelope by the distance pieces, and tread bars 19 of rubber bonded to metal strips 20, the shanks of the bolts 16 extending through bolt holes in the bars 15, distance pieces 17, band 18, strips 20 and having their heads embedded in and bonded to the rubber tread bars.

Projecting inwardly from intermediate the ends of each bar 15 is a lug 21 and to each lug is pivoted the outer ends of a pair of flexible spokes or tie members which as shown converge outwardly from the hub to the lug but which may converge outwardly from the hub and then diverge so that they cross intermediate their ends. Each spoke or tie member consists of a length of flexible, preferably steel, cable 22 which may be stranded, and secured at its outer portion in a nipple 23 which has a bifurcated outer portion which is apertured to receive a pivot pin secured to the lug 21. The inner end portion of the cable is similarly secured to a nipple 24 which is pivoted to one of a series of outwardly projecting lugs of a ring 25 closely surrounding the hub but held from axial movement thereon by studs 26.

There are also provided a circular series of flexible ties 27 of steel cable which cross connect the end walls of the envelope at intervals within the latter intermediate the hub and the periphery of the envelope. The end portions of each tie 27 are secured in nipples 28 projecting inwardly from flanges thereof, from which flanges project screw threaded shanks 29 which extend through apertures in sealing rings 30 of rubberised fabric, an aperture in the adjacent side wall of the envelope and an aperture in a disc 31. A nut is screwed on the end portion of the threaded shank so that the sealing rings and the portion of the side wall between them are clamped together in an air tight manner between the flange and the disc 31.

Each lug 21 has secured thereto a ring 32 and through all the rings there extends a continuous elastic cord or tension spring and a similar elastic cord or spring surrounds the cables 27 in contact therewith. These cords or springs are under tension in the inflated condition of the envelope.

Within the hub there projects an inflation and deflation valve which comprises a tubular member 33 communicating at its outer end with the interior annular space enclosed by the envelope and the hub, and having its outer end sealed by a cover 34. Within the tubular member there fits a rubber sleeve providing a valve member which is adhered as by adhesive throughout half its circumference to the member 33 on the side remote from a tubular member 35 having a sealing cap 36 and providing for supply and release of air under pressure to and from the envelope.

The cylindrical portion of the envelope and the band 18 during manufacture are preferably transversely folded or scored as indicated at 39 and 40 to facilitate collapsing of said portion and band in bellows fashion as will be hereafter referred to.

As shown in Figure 1 each wheel in the case of a light motor propelled vehicle, having a four wheel drive, for example a military vehicle known as a "jeep" may be secured to a transmission sleeve 41 secured to one of the road wheels of the vehicle and it will be seen from the figure that when inflated the wheels as above described are of greater diameter than the road wheels. Suitable dimensions for the pneumatic wheels for the foregoing application of the invention are: diameter four feet, width one foot six inches and it has been found that they afford adequate buoyancy for the vehicle when afloat. The transverse rubber tread bars act as paddles to propel the vehicles when afloat but auxiliary paddles are preferably provided as follows in order to increase the rate of propulsion. The auxiliary paddles comprise vanes 41 of flexible rubberised fabric. The vanes before being attached to a wheel are each of a configuration as shown in full lines in Figure 5 and each has a row of apertures 42 parallel to and adjacent the outer edge. The leading edge 43 and the trailing edge 44, of the lower portions of the vanes converge in a direction away from the outer edge to a semicircular portion concentric with an aperture 45. The row of apertures 42 and the aperture 45 provide for securing the vanes to the wheel. Thus the row of apertures 42 is utilised to secure the outer margin of each vane to the band 18 beneath the latter and between adjacent treads by means of rivets 42a, Figure 6, and the aperture 45 serves for threading on to one of the shanks 29 between the outer sealing ring 30 and the side wall of the envelope. When thus secured in position as shown in Figure 6 the intermediate portion of each vane has a longitudinal arcuate curvature such that an interior space is provided between it and the adjacent end wall of the envelope of gradually decreasing cross section from the leading to the trailing edge as indicated in Figure 1.

In use when a vehicle is travelling on a road or other surface such as soft or snow covered ground the load will cause more or less lengthwise and transverse flattening of the tread portion. In the surface is soft or snow covered the wide treads serve to avoid considerable sinking of the wheels thereinto and the transverse tread bars prevent substantial slipping of the wheels. The band 18 prevents damage to the cylindrical wall of the envelope when the vehicle is travelling over rough ground, by stones or other objects that might cause abrasion or penetration of the band if it were in contact therewith. The band when worn can be removed and replaced by a similar band. A further function of the band 18 is that in travel over soft or snow covered ground which is liable to cling to the tread, the flattened portion in contact with the ground causes the distance between two successive adjacent tread bars to be reduced as compared with the normal distance when they are out of engagement with the ground. The portion of the outer band between the two bars will also be depressed towards the cylindrical portion of the envelope due to the packing of snow or mud in the channel afforded thereby and the two bars. When these two bars and the portion of the band 18 between them have moved out of contact with the ground they will move to their normal positions and shed the snow or mud.

The flexible cross ties prevent the side walls of the envelope bulging unduly when the wheel is inflated and under load and they are under slight tension when the envelope is in inflated condition but as will be readily understood when the wheel is in contact with the ground and under load those cross ties which are directly above that part of the wheel in contact with the ground will be under increased tension, due to the flattening.

The two series of convergent flexible spokes (a) prevent undue lateral bodily deflection of the envelope as might occur due to lateral thrust and (b) resist excessive flattening of the lower portion of the envelope when the wheel is under load.

Thus in the case of (a) such deflection which would result in movement of the tread laterally in either direction would cause the flexible spokes of one series to be placed under increased tension so that when the lateral thrust ceases such deflection will automatically be eliminated.

In regard to (b) such excessive flattening will be resisted by increased tensioning of both series of flexible spokes particularly those in that part of the envelope which is out of contact with the ground.

When the envelope is deflated the elastic cords collapse the envelope to the form shown diagrammatically in Figure 3 and such collapsing may be such that the diameter of the wheel is less than the diameter of the wheel to which it is secured so that the vehicle can then be run on the normal wheels.

I claim:

1. A pneumatic wheel comprising an inflatable envelope of flexible non-elastic impervious material having a cylindrical or substantially cylindrical tread portion reinforced by transverse laterally spaced members, and inwardly projecting side walls secured at their central portions in an airtight manner to a member extending axially through the envelope, a series of flexible ties within the envelope and extending about the axis thereof in spaced relation to said member each of which ties is connected at its ends to the side walls, and two series of flexible ties each of which is connected at one end to said member and at the other end to the peripheral wall said two series converging outwardly from said member towards said wall.

2. A pneumatic wheel as claimed in claim 1 wherein said reinforcing members are bars each secured against the inner periphery of the cylindrical wall.

3. A pneumatic wheel as claimed in claim 2, wherein each bar is secured to one of a plurality of transverse laterally spaced rubber tread bars secured against the exterior surface of the tread.

4. A pneumatic wheel as claimed in claim 1 wherein a continuous band of flexible material is secured transversely at intervals in spaced relation to the tread portion.

5. A pneumatic wheel as claimed in claim 1 wherein the band is secured against the outer faces of laterally spaced bars transverse to and secured against the outer periphery of said tread portion.

6. An amphibious motor propelled vehicle having pneumatic wheels as claimed in claim 1 each wheel having a plurality of laterally spaced flexible vanes each secured at its ends portion against the outer surface of one side wall of the envelope and spaced at its intermediate portion from the wall the interior space thus provided between the vane and said wall increasing in cross section from the leading edge of the vane to the trailing edge thereof.

7. An amphibious motor propelled vehicle as claimed in claim 1 wherein each wheel is secured to a road wheel of the vehicle for rotation therewith and has therein elastic cords which act on the end walls and the cylindrical tread portion when the envelope is deflated to collapse them inwardly to bellows form such that the envelope is of less diameter than the road wheel.

References Cited in the file of this patent

UNITED STATES PATENTS

| | | |
|---|---|---|
| 1,110,156 | Stewart | Sept. 8, 1914 |
| 1,225,181 | Schleicher | May 8, 1917 |
| 2,187,658 | Lane | Jan. 16, 1940 |
| 2,495,643 | Pidgeon | Jan. 24, 1950 |